Jan. 28, 1958   C. E. VOGELEY, JR., ET AL   2,821,701
AUTOMATIC RADAR TRACKING-SYSTEM
Filed April 1, 1948
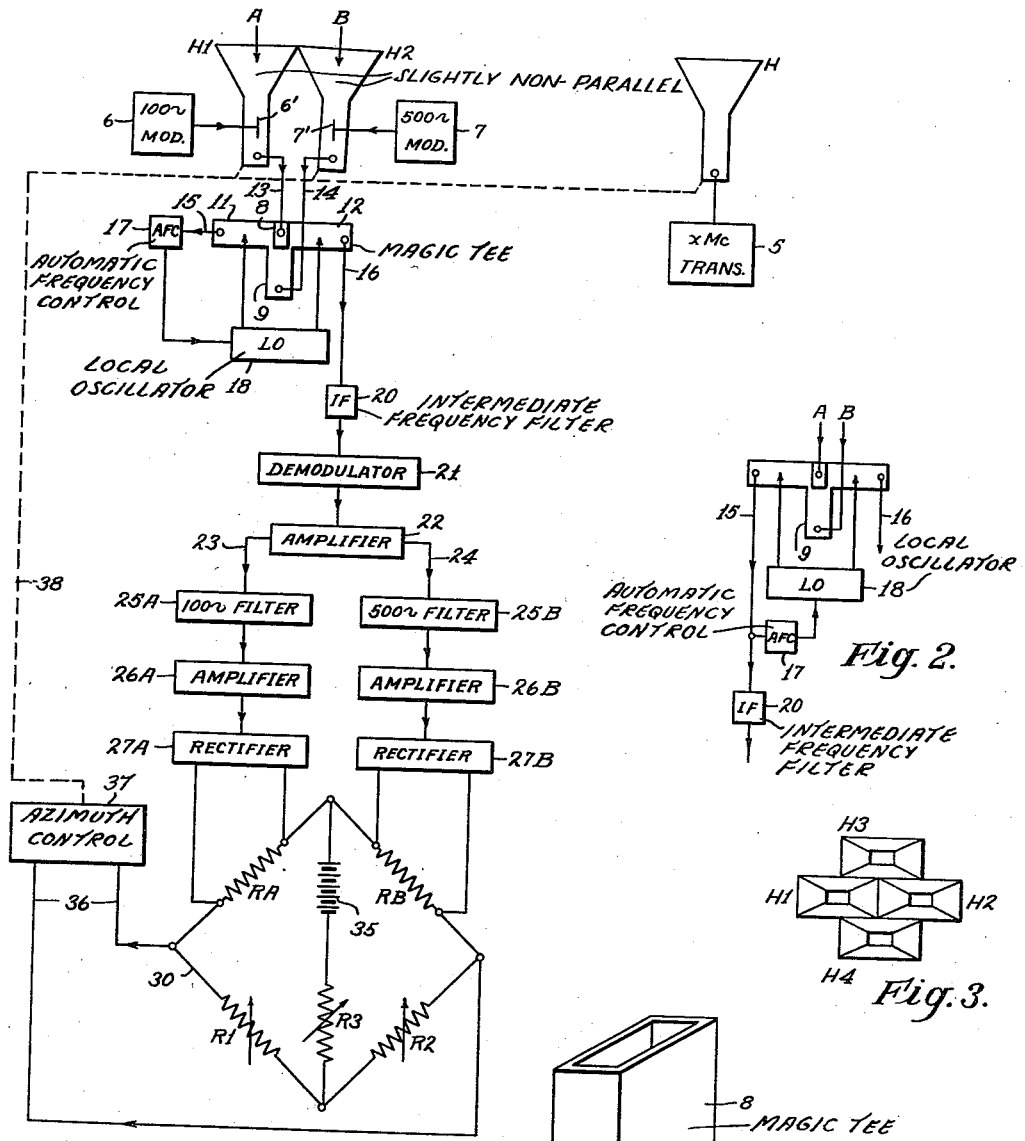
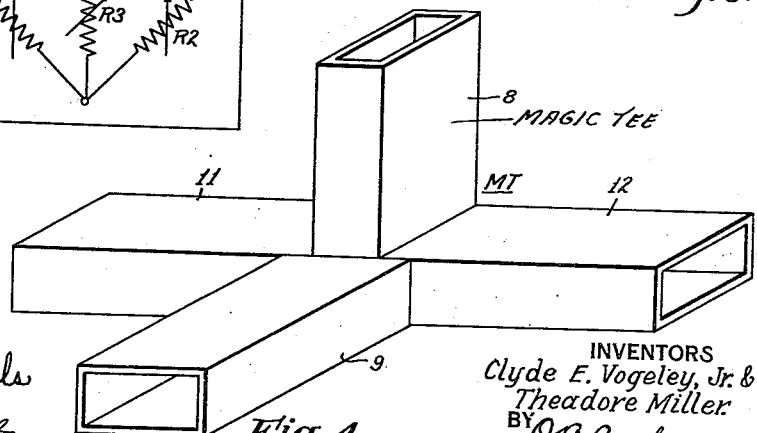
WITNESSES:
Edward Michaels
Nw. L. Groove
INVENTORS
Clyde E. Vogeley, Jr. &
Theodore Miller
BY O.B. Buchanan
ATTORNEY

United States Patent Office 2,821,701
Patented Jan. 28, 1958

2,821,701

AUTOMATIC RADAR TRACKING-SYSTEM

Clyde E. Vogeley, Jr., and Theadore Miller, Pittsburgh, Pa., assignors, by mesne assignments, to the United States of America as represented by the Secretary of the Navy Application April 1, 1948, Serial No. 18,344

4 Claims. (Cl. 343—7.4)

Our invention relates to a novel type of automatic radar tracking-system, which is particularly adapted for continuous-wave radar, although it can be used in connection with any kind of transmitter-system or systems which send out high-frequency radio-waves or microwaves which are reflected to our target-tracking echo-wave device.

The principal object of our invention is to provide a target-tracking echo-wave device comprising a directional receiving-antenna system which includes two antenna-means, aimed slightly off-center with respect to each other, in any given plane, such as the azimuth plane or the elevation plane, for receiving two echo-waves from the target, and to provide modulator-means for in effect separately modulating these two echo-waves at different modulator-frequencies, so that, after suitable amplification and demodulation, the power-levels of these two modulator-frequency waves may be measured and compared with each other, these power-levels being proportional to the relative amounts of power which are contained in the two echo-waves which serve as carrier-waves for the respective modulator-frequencies. Hence, if the directional receiver-antenna system is not pointing directly at the target, in the plane in which the directional comparison is being made, the modulator-frequency energy-level from one or the other of the two echo-waves will predominate, thereby furnishing a control-current which varies in direction and magnitude in accordance with the variation from the true aiming direction of the antenna-system, thereby providing control-current which can be used in automatically controlling the direction or aim of the antenna-system. In devices where the target must be tracked in both azimuth and elevation, separate devices may be provided for tracking the target in these two directions.

With the foregoing and other objects in view, our invention consists in the circuits, systems, combinations, apparatus, parts and methods of operation and design, hereinafter described and claimed, and illustrated in the accompanying drawing, wherein:

Figure 1 is a block-diagram drawing illustrating the essential component parts and connections of an illustrative form of embodiment of our invention;

Fig. 2 is a fragmentary detail showing a variation in the connection;

Fig. 3 is a front view showing a horn-array for both azimuth and elevation tracking, and Fig. 4 is a perspective view of a magic tee, such as may be used advantageously in carrying out some aspects of our invention.

In Figure 1, we have illustrated a simple form of our invention which is used only in azimuth-tracking of a target. This illustrates the general principals of our invention, because, when elevation-tracking is necessary, the elevation-tracking apparatus is merely a repetition of the azimuth-tracking apparatus, turned at right angles.

In the illustrative form of embodiment of our invention, as shown in Figure 1, a radiant-energy transmitter-system is diagrammatically indicated, as comprising a transmitter 5 operating at $x$ megacycles (mc.). This transmitter is preferably a continuous-wave transmitter, although our invention is not limited to this particular type of transmitter.

This transmitter 5 is used as a part of a target-tracking echo-wave device which includes a directional antenna-system for aiming a transmitted wave from said transmitter to a target (not shown) and for receiving an echo-wave from the target. This directional antenna-system may take any one of a number of forms, which are well known in the art; and it may comprise either one antenna or a plurality of separate mechanically connected antennas. By way of illustration of a representative type of antenna-system, without in any way desiring to limit ourselves to this particular type of antenna-system, we have shown a directional antenna-system comprising three horns, a horn H for transmitting the wave from the transmitter 5, and two horns H1 and H2 for receiving two echo-waves A and B from the target, these receiver-horns H1 and H2 being directed at a slight angle different from exact parallelism, so that they are aimed slightly off-center with respect to each other, in a given plane, that is, in the azimuth plane, assuming that the apparatus is designed to track the target in azimuth.

In accordance with our invention, the two receiver-horns H1 and H2 are acted upon by two modulator-means, which are schematically indicated as two blocks 6 and 7, which are operated at any two different modulator-frequencies, the modulator-frequencies of 100 cycles and 500 cycles being indicated merely by way of example. These two modulator-means 6 and 7 are used to energize two wave-modulating attenuators, which may be rotating discs 6' and 7', operating in the wave-guide parts of the two receiver-horns H1 and H2, respectively, for modulating the A-wave, in horn H1, at a modulating frequency of say 100 cycles, and modulating the B-wave in the receiver-horn H2, at some different modulating frequency, say 500 cycles.

It is another feature of our invention, although it is not an essential feature in all aspects of our invention, to feed the differently modulated outputs of the two receiver-horns H1 and H2 into the two input T-arms of a magic tee MT, the details of which are shown more clearly in Fig. 4. As shown in Fig. 4, the magic tee has a vertical input T-arm 8, a horizontal or lateral input T-arm 9, and a straight cross-piece or wave-guide portion ending in two output terminals 11 and 12, respectively. If the magic tee is balanced, as would normally be the case, and if the radio-frequency signal A is fed into the vertical arm 8, as diagrammatically indicated at 13 in Fig. 1, and if the radio-frequency signal B is lead into the horizontal lateral arm 9, as diagrammatically indicated at 14 in Fig. 1, then the signal appearing at the left-hand terminal 11 will be (A+B), while the signal appearing at the right-hand terminal 12 will be (B−A).

The magic tee MT thus provides a very accurate, compact and convenient means for combining the two weak radio-frequency signals A and B which come in through the two receiver-horns H1 and H2 or their equivalent. It is to be noted that the two received signals A and B are essentially signals or waves, of the same frequency, which are received from a single point or target, through two non-parallel directional receiving-antennas H1 and H2, regardless of whether said signals originate in the target or are merely reflected from the target because it is "illuminated" at the frequency of the received waves or signals. The magic tee simultaneously produces the sum of these two signals, and their difference, in the opposite terminals 11 and 12 of the T, and these sum and difference-signals may be supplied, respectively, through output-leads or conductors 15 and 16. It is possible to make actual use of only one of these combined signals, either the sum-wave (A+B) or the difference-wave (B—A), or both may be used. The sum-wave (A+B) is advantageous in providing a signal at all times, which is advantageous for the purpose of gating or selecting or locking onto a target-reflection, and it is also useful for energizing an automatic frequency-control device, such as is diagrammatically indicated at 17 in Fig. 1, which may be used for controlling a local oscillator 18, which is used to heterodyne both the sum-signal in the arm 11 and the difference-signal in the arm 12, as indicated in Fig. 1. On the other hand, the difference-wave (B—A) is useful because it lends itself to a null-reading response-system, which is well known to be remarkable for its accuracy or sharpness of tuning or adjustment, when it is being adjusted to its exact null-reading point.

In accordance with our present invention, our antenna-directing apparatus may utilize either the difference-signal (B—A), as it appears in the output-conductor 16 of the magic tee MT, as shown in Fig. 1, or it may utilize the sum-signal (A+B), which appears in the conductor 15, as indicated in Fig. 2. It is also quite feasible, in using our invention, to keep the two signal-waves A and B separate, without combining them at all, because, even though the waves are combined, they will later be separated into separate channels carrying the two different modulation-frequencies of 100 cycles and 500 cycles, respectively, in the example illustrated in the drawing, as will be subsequently pointed out.

If the two received signals A and B are combined, either into the sum-wave (A+B) or into the difference-wave (B—A), as shown in Fig. 1, then that combined wave is passed first through an intermediate-frequency (I. F.) filter or amplifier 20, then through a demodulator 21, which separates out the two modulation-frequencies of 100 cycles and 500 cycles, respectively, and usually also through an amplifier 22.

In the amplifier 22, as shown in Fig. 1, the combined signals are separated into two channels, one channel 23 for the 100-cycle modulation-frequency, and the other channel 24 for the 500-cycle modulation-frequency. Except for their tuning, these two separate channels are identical. In the particular form of embodiment shown in Fig. 1, each of these two channels 23 and 24 comprises first a filter 25, which is tuned to its particular modulation-frequency, then an amplifier 26, and finally a rectifier 27, suffixes A and B being added to distinguish between the two channels.

The rectifiers 27A and 27B are used to energize two resistances, RA and RB, respectively, of a bridge 30, the other two arms of which consist of variable resistances R1 and R2. The diagonal connecting the junction-point of resistances RA and RB to the junction-point of the resistances R1 and R2 is the input-diagonal of the bridge, shown as comprising a battery 35 and a variable resistor R3. The other diagonal of the bridge constitutes the output-terminals, which energize the output-circuit 36 of the bridge, furnishing a voltage which varies in sign and magnitude in accordance with the relative magnitudes of the two modulator-frequency waves. The bridge-output circuit 36 is used to control an automatic azimuth-control apparatus, which is symbolically indicated at 37, and which is mechanically connected to the antenna-system H, H1 and H2 as diagrammatically indicated by dotted lines at 38.

In the operation of our system, the essential feature is that two radio-frequency waves A and B, of the same frequency, shall be received from the target (not shown) through any sort of off-center directional receiving-antenna means, such as are symbolized by the two receiver-horns H1 and H2. It is also essential that these two receiver-waves A and B shall be modulated at different modulator-frequencies. The two received waves A and B thus operate, respectively, as the carriers for the modulator-frequencies, so that the relative strengths of these modulator-waves, as carried by the two modulated receiver-waves A and B, will be dependent upon the relative strengths of the respective carrier-waves A and B.

It is generally necessary, in order to keep down the level of ground-noises, to heterodyne down the frequency of the carrier-waves A and B to a suitable intermediate frequency IF, and this heterodyning process also operates as an amplifying means, which is also necessary because of the extreme weakness of the received signal. Because we have superimposed different identifying modulator-frequencies on the two received waves A and B, it is also necessary, in our system, to demodulate these waves, so as to obtain, again, the distinctive modulator-frequencies, which can be separately responded to and compared as to their relative magnitudes. It is convenient, but obviously not obligatory, to combine these two received waves A and B into a single channel, producing either the sum-wave (A+B) or the difference-wave (B—A), so that the local-oscillator heterodyning, the amplification, and the demodulation may all be performed on the same combined wave, instead of having to duplicate this equipment, for the two different waves.

After the two distinctive modulator-frequencies have been segregated in the demodulator 21, they are separated into the two channels, one for each modulator-frequency, where they are identically amplified, and finally rectified, so as to produce unidirectional-voltage outputs which are proportional to the strength of the modulator-wave signal which is carried by the respective received waves A and B. Since the strengths of these modulator-frequency waves are dependent upon the relative strengths of the carrier-waves A and B, respectively, the relative magnitudes of the unidirectional-voltage outputs of the two rectifiers 27A and 27B will be responsive to the relative strengths of the two received signals A and B.

In accordance with our invention, any convenient voltage-comparison means may be utilized, as exemplified by the bridge 30, for subtracting one of the rectified voltages from the other, so as to produce an output which varies, in sign and magnitude, according to whether the directionally received signal A or B is the larger.

It will be observed that our system is self-balancing, so that the correcting voltages which are produced in the output-circuit 36 of the bridge, are a function of position alone, and are independent of the range or the echo-area of the target.

While we have described our system more particularly with respect to azimuth-control, it will be obvious that a duplicate of the same system, turned at right angles, could also be used to obtain corrections in elevation. This would imply an arrangement of a directional receiver-antenna system which is operative in elevation as well as in azimuth. If the receiver-antenna system is in the form of horns, to carry out our original illustration, this would imply four horns, as shown in front view in Fig. 3, these horns including the two previously described azimuth-finding horns H1 and H2, and two elevation-finding horns H3 and H4.

While we have particularly described and claimed an exemplary form of embodiment of our invention, and while we have explained our present ideas relative to its design and performance, we do not wish to be limited to the precise illustrations and explanations which we have given, as it will be obvious that various changes may be made by the skilled workers of the art, by way of additions or refinements, omissions or simplifications, or the substitution of various equivalents, without departing from the essential features of our invention, in its various aspects. We desire, therefore, that the appended claims shall be accorded the broadest construction consistent with their language.

We claim as our invention:

1. A target-tracking echo-wave device, comprising a transmitter-system, a directional antenna-system for aiming a transmitted wave from said transmitter-system to a target and for receiving an echo-wave from said target, at least the receiving part of said directional antenna-system including means, aimed slightly off-center with respect to each other in a given plane, for receiving two echo-waves from said target, modulator-means for in effect separately modulating said two echo-waves at different modulator-frequencies, and means for demodulating said two modulated echo-waves and for separately responding to, and rectifying, the two modulator-frequencies and comparing the rectified signals with each other in such a way as to obtain, in effect, a unidirectional control-voltage which varies in sign and magnitude in accordance with which one of the two echo-waves is the stronger, and automatic antenna-aiming means, responsive to said control-voltage, for so controlling said antenna-system as to track the target in said given plane.

2. A target-tracking echo-wave device, comprising a transmitter-system, a directional antenna-system for aiming a transmitted wave from said transmitter-system to a target and for receiving an echo-wave from said target, at least the receiving part of said directional antenna-system including means, aimed slightly off-center with respect to each other in a given plane, for receiving two echo-waves from said target, modulator-means for in effect separately modulating said two echo-waves at different modulator-frequencies, means for in effect combining the two differently modulated echo-waves, means for demodulating and amplifying the resultant combined echo-wave, and means for separately responding to, and rectifying, the two modulator-frequencies and comparing the rectified signals with each other in such a way as to obtain, in effect, a unidirectional control-voltage which varies in sign and magnitude in accordance with which one of the two echo-waves is the stronger, and automatic antenna-aiming means, responsive to said control-voltage, for so controlling said antenna-system as to track the target in said given plane.

3. A target-tracking wave-device, comprising a directional antenna-system including means, aimed slightly off-center with respect to each other in a given plane, for receiving two waves of the same frequency from said target, modulator-means for in effect separately modulating said two waves at different modulator-frequencies, and means for demodulating said two modulated waves and for separately responding to, and rectifying, the two modulator-frequencies and comparing the rectified signals with each other in such a way as to obtain, in effect, a unidirectional control-voltage which varies in sign and magnitude in accordance with which one of the two waves is the stronger, and automatic antenna-aiming means, responsive to said control-voltage, for so controlling said antenna-system as to track the target in said given plane.

4. A target-tracking wave-device, comprising a directional antenna-system including means, aimed slightly off-center with respect to each other in a given plane, for receiving two waves of the same frequency from said target, modulator-means for in effect separately modulating said two waves at different modulator-frequencies, means for in effect combining the two differently modulated waves, means for demodulating and amplifying the resultant combined wave, and means for separately responding to, and rectifying, the two modulator-frequencies and comparing the rectified signals with each other in such a way as to obtain, in effect, a unidirectional control-voltage which varies in sign and magnitude in accordance with which one of the two received waves is the stronger, and automatic antenna-aiming means, responsive to said control-voltage, for so controlling said antenna-system as to track the target in said given plane.

References Cited in the file of this patent

UNITED STATES PATENTS

| | | |
|---|---|---|
| 2,216,708 | Kolster | Oct. 1, 1940 |
| 2,409,462 | Zworykin | Oct. 15, 1946 |
| 2,409,448 | Rost | Oct. 15, 1946 |
| 2,445,213 | Evans | July 13, 1948 |
| 2,445,895 | Tyrrell | July 27, 1948 |
| 2,480,829 | Barrow | Sept. 6, 1949 |
| 2,523,398 | Southworth | Sept. 26, 1950 |
| 2,682,656 | Phillips | June 29, 1954 |